J. J. GROGAN.
LOOM.
APPLICATION FILED OCT. 30, 1907.
912,309.
Patented Feb. 16, 1909.
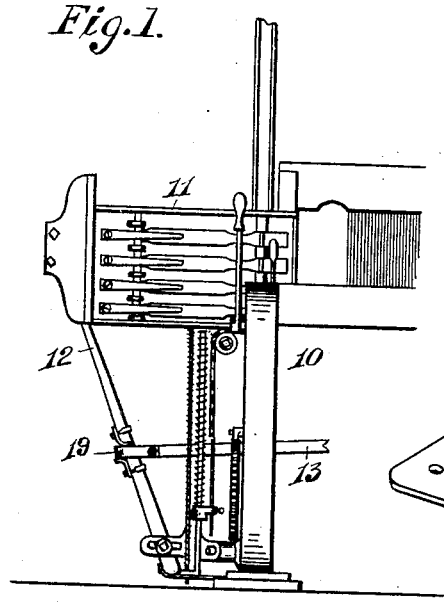
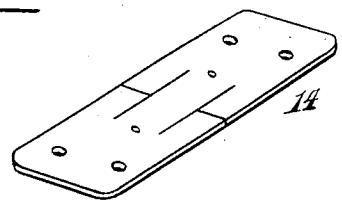
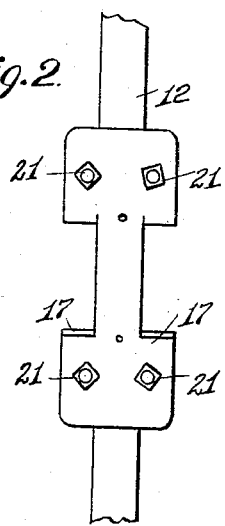
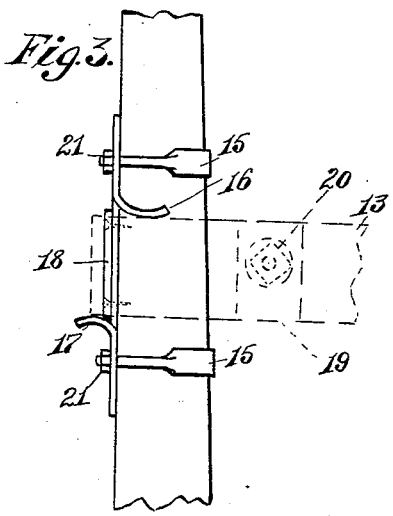
Witnesses:
George Oltsch
G. M. Cole
James J. Grogan
Inventor
By _____
Atty.

UNITED STATES PATENT OFFICE.

JAMES J. GROGAN, OF SOUTH BEND, INDIANA.

LOOM.

No. 912,309.　　　Specification of Letters Patent.　　　Patented Feb. 16, 1909.

Application filed October 30, 1907. Serial No. 399,834.

*To all whom it may concern:*

Be it known that I, JAMES J. GROGAN, a citizen of the United States, residing at South Bend, in the county of St. Joseph and State of Indiana, have invented certain new and useful Improvements in Looms, of which the following is a specification.

This invention relates to improvements in looms, more particularly to the "picker staff" and "picker sweep" portions of devices of this character, and has for its object to improve the construction and increase the efficiency and utility of the means for coupling the picker sweep to the picker staff.

With these and other objects, the invention consists in certain novel features of construction as hereafter shown and described and specifically pointed out in the claims.

In the drawings employed for illustrating the embodiment of the invention:—Figure 1 represents a side elevation of a portion of a loom including one of the picker staffs and a portion of the picker sweep, with the improvement applied. Fig. 2 is a front elevation of a section of the picker staff with the portion of the improved device appertaining to the picker staff attached thereto. Fig. 3 is a side elevation of the parts shown in Fig. 2 with a section of the picker sweep and the portion of the improved device which appertains to the picker sweep connected thereto. Fig. 4 is a perspective view of the blank of the portion of the device which is attached to the picker staff before it is bent into required shape.

In Fig. 1 is shown a portion of a conventional loom 10 including one of the shuttle boxes represented at 11, and one of the picker sweeps represented at 12, and a portion of one of the picker sweeps represented at 13, these parts being of the usual form.

The improvement lies in the means for coupling the picker sweep 13 to the picker staff 12; and this improvement comprises a plate 14, preferably of sheet steel or other suitable material of a width considerably greater than the picker staff 12 and connected thereto in any suitable manner, preferably by clips 15. Formed in the plate 14 centrally thereof are two T-shaped clefts, as shown in Fig. 4, the clefts providing means whereby tongues 17—17 may be bent in opposite directions from the plate, the tongue 16 to bear against the sides of the picker staff 12 and the tongue 17 to project laterally therefrom, as shown in Figs. 1 and 3, the tongues being preferably curved at their inner faces as shown. Attached to the outer face of the plate 14 between the tongues is a strap of leather or like material 18. Attached to the picker sweep 13 is a U-shaped strap 19, bearing over the picker staff 12 between the tongues 16—17 and likewise over the leather strap 18, and connected by its terminals to the picker sweep, as by a bolt 20 or other suitable fastening.

The end of the picker sweep does not quite come in contact with the inner surface of the picker staff, so that a slight degree of play exists between the picker staff and picker sweep, so that during the operation of the device the change of center produced by the slight segmental movement of the tongues 16—17 on the picker staff will not cause a cramping action between the tongues and the strap, the curved form of tongues producing a slight rolling motion between the parts as will be obvious.

In the operation of looms the rapid movement or "jerks" exerted by the sweep staff produces strains or shocks between the parts, and the present invention is designed to relieve the picker staff from the severity of the strains exerted by such rapid motion, and the leather strap 18 is therefore an important feature in the operation of the device.

It will be noted that the parts appertaining to the picker staff are connected thereto without reducing the size of the picker staff, or otherwise weakening it, but on the contrary the attachment of the plate to the picker staff between the clips 15 which are spaced at a considerable distance apart materially strengthens the picker staff and distributes the strains over a relatively large area thereof. This is an important feature of the invention and produces a marked departure from the prior structures of this character.

The plate 14 can be readily adjusted longitudinally of the picker staff by simply loosening the nuts 21 of the clips 15, to which the "throw" of the picker staff is attached. The device is very simple in construction, can be inexpensively manufactured, and readily applied to picker staffs of various sizes and forms, and thus adapted to all the various constructions of looms.

Having thus described the nature of the invention, what is claimed is—

1. In a device of the class described, a sheet metal plate adapted to be detachably and adjustably connected to a picker staff and provided with recesses in its opposite edges and with tongues projecting laterally at the ends of the recesses, and a U-shaped strap bearing over the portion of the plate between the recesses and likewise between the projections and adapted to be attached to a sweep staff.

2. In a device of the class described, a plate adapted to be detachably connected to a picker staff and provided with recesses in its opposite sides and with curved tongues projecting laterally at the ends of the recesses to form bearings at the ends of the recesses, and a U-shaped strap bearing over a portion of the plate between the recesses and likewise between the projecting tongues and adapted to be attached to a sweep staff.

3. In a device of the class described, a plate of sheet metal with clefts in the side whereby tongues are formed and adapted to be bent in opposite directions thereby producing oppositely disposed recesses with bearing elements at the ends, means for detachably and adjustably connecting said plate to a picker staff, and a U-shaped strap engaging said plate within said recesses and between said tongues, and means for attaching said strap to a sweep staff.

4. In a device of the class described, a plate of sheet metal and T-shaped clefts in the side whereby tongues are formed and adapted to be bent laterally therefrom thereby producing oppositely disposed recesses with bearing elements at the ends, means for detachably and adjustably connecting said plates to a picker staff, and a U-shaped strap engaging said plate within said recesses and between said tongues, and means for attaching said strap to a sweep staff.

In testimony whereof I affix my signature, in presence of two witnesses.

JAMES J. GROGAN.

Witnesses:
GEORGE OLTSCH,
G. M. COLE.